United States Patent
Wenger et al.

(10) Patent No.: US 10,070,575 B2
(45) Date of Patent: Sep. 11, 2018

(54) AGRICULTURAL MACHINE WITH FOLDING HEADER

(71) Applicant: CNH Industrial America LLC, New Holland, PA (US)

(72) Inventors: Bradley J. Wenger, Lancaster, PA (US); Zachary Long, Harleysville, PA (US); Craig D. Roberts, New Holland, PA (US); Andrew V. Lauwers, Stevens, PA (US); Blaine R. Noll, Fleetwood, PA (US); James F. Rayfield, New Holland, PA (US); John J. Conroy, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 103 days.

(21) Appl. No.: 15/229,912

(22) Filed: Aug. 5, 2016

(65) Prior Publication Data

US 2018/0035598 A1 Feb. 8, 2018

(51) Int. Cl.
*A01D 34/00* (2006.01)
*A01B 73/06* (2006.01)
(Continued)

(52) U.S. Cl.
CPC ............ *A01B 73/065* (2013.01); *A01D 34/04* (2013.01); *A01D 41/144* (2013.01); *A01D 2101/00* (2013.01)

(58) Field of Classification Search
CPC .... A01D 41/144; A01D 34/246; A01B 73/02; A01B 73/06; A01B 73/044
See application file for complete search history.

(56) References Cited

U.S. PATENT DOCUMENTS 3,345,808 A * 10/1967 Van Der Lely ...... A01D 34/246
56/10.2 R
4,320,805 A * 3/1982 Winter ................. A01B 73/044
172/456
(Continued)

FOREIGN PATENT DOCUMENTS

DE 3828293 C1 1/1990
DE 39 06 456 A1 9/1990
(Continued)

OTHER PUBLICATIONS

European Search for European Application No. 17184871.6 dated Jan. 2, 2018 (5 pages).

*Primary Examiner* — Arpad Fabian-Kovacs
(74) *Attorney, Agent, or Firm* — Peter K. Zacharias; Patrick M. Sheldrake (57) ABSTRACT

An agricultural harvester includes a chassis and a header carried by the chassis. The header includes: a center section supporting at least one center cutter and having a pair of lateral ends; a wing section linked to one of the lateral ends of the center section and supporting at least one wing cutter, the wing section being vertically moveable relative to the center section between a harvesting position and a transport position, the wing section being pivotable about a generally vertical pivot axis in the transport position and substantially prevented from pivoting about the pivot axis in the harvesting position; and an actuator linked to the wing section and configured to vertically move the wing section from the harvesting position to the transport position.

17 Claims, 8 Drawing Sheets

(51) Int. Cl.
*A01D 34/04* (2006.01)
*A01D 41/14* (2006.01)
*A01D 101/00* (2006.01)

(56) References Cited

U.S. PATENT DOCUMENTS

| | | | |
|---|---|---|---|
| 4,409,780 A | 10/1983 | Beougher et al. | |
| 4,487,004 A * | 12/1984 | Kejr | A01D 41/14 56/14.4 |
| 4,564,025 A | 1/1986 | Dammann | |
| 4,903,470 A | 2/1990 | Hemker et al. | |
| 5,673,543 A * | 10/1997 | Richardson | A01D 41/144 56/228 |
| 5,724,798 A * | 3/1998 | Stefl | A01D 41/144 172/311 |
| 5,845,472 A * | 12/1998 | Arnold | A01D 41/144 56/228 |
| 5,911,625 A * | 6/1999 | von Allworden | A01D 41/144 460/119 |
| 7,360,351 B2 * | 4/2008 | Rickert | A01D 41/144 56/228 |
| 7,614,206 B2 * | 11/2009 | Tippery | A01D 41/144 56/15.8 |
| 9,775,291 B2 * | 10/2017 | Neudorf | A01D 41/145 |
| 9,795,083 B2 * | 10/2017 | Van Vooren | A01B 73/06 |
| 2003/0041579 A1 * | 3/2003 | Wuebbels | A01D 41/144 56/15.2 |
| 2003/0226342 A1 * | 12/2003 | Boeckmann | A01D 41/144 56/14.7 |
| 2004/0200203 A1 * | 10/2004 | Dow | A01B 73/02 56/375 |
| 2005/0028509 A1 * | 2/2005 | Viaud | A01D 41/148 56/341 |
| 2014/0033670 A1 * | 2/2014 | Cressoni | A01D 41/144 56/104 |
| 2016/0066508 A1 * | 3/2016 | Van Vooren | A01B 73/06 56/12.7 |

FOREIGN PATENT DOCUMENTS

| | | |
|---|---|---|
| EP | 1932416 A1 | 6/2008 |
| EP | 2 067 397 A1 | 6/2009 |
| FR | 3 001 359 A1 | 8/2014 |

* cited by examiner

AGRICULTURAL MACHINE WITH FOLDING HEADER

FIELD OF THE INVENTION

The present invention relates to agricultural vehicles, and, more particularly, to agricultural harvesters which include a header.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

Typically, the header includes one or more cutters, such as cutter bars, which cut the crop material growing in the field for collection. The cutter(s) often define the largest width of the combine, relative to forward motion, in order to cut as much crop material as possible in each pass of the combine in the field. As combines become larger to reduce the number of passes necessary to harvest an entire field, the headers have also increased dramatically in width. While this is beneficial while collecting crops in the field, the increased width of the header is problematic during transport of the combine.

As is known, combines generally travel at low speeds on unpaved terrain during crop harvesting. If a user wishes to transport the combine to a different location that is relatively far from the current location, the combine is typically towed or otherwise carried by a faster vehicle on regulated public roadways. Public roadway regulations limit the width of any vehicle traveling on the public roadway for the safety of all those on the roadway. As the header width is usually significantly greater than the allowed limit, the combine cannot be carried on public roadways without somehow reducing the width of the header.

What is needed in the art is a way to reduce the width of the header for transport.

SUMMARY OF THE INVENTION

In accordance with an aspect of the present invention, there is provided a center section and one or more wing sections linked to the center section which can only pivot about a generally vertical axis when the wing section or center section is in a vertical transport position.

In accordance with another aspect of the present invention, there is provided an agricultural harvester including a chassis and a header carried by the chassis. The header includes: a center section supporting at least one center cutter and having a pair of lateral ends; a wing section linked to one of the lateral ends of the center section and supporting at least one wing cutter, the wing section being vertically moveable relative to the center section between a harvesting position and a transport position, the wing section being pivotable about a generally vertical pivot axis in the transport position and substantially prevented from pivoting about the pivot axis in the harvesting position; and an actuator linked to the wing section and configured to vertically move the wing section from the harvesting position to the transport position.

In accordance with yet another aspect of the present invention, there is provided an agricultural harvester including a chassis and a header carried by the chassis. The header includes: a center section supporting at least one center cutter and having a pair of lateral ends, the center section being vertically moveable relative to the chassis between a harvesting position and a transport position; a wing section linked to one of the lateral ends of the center section and supporting at least one wing cutter, the wing section being pivotable about a generally vertical pivot axis when the center section is in the transport position and substantially prevented from pivoting about the pivot axis when the center section is in the harvesting position; and an actuator linked to the center section and configured to vertically move the center section from the harvesting position to the transport position.

In accordance with still another aspect of the present invention, there is provided a method of preparing an agricultural vehicle for transport, the agricultural vehicle including a chassis and a header linked to the chassis which includes a center section supporting at least one center cutter and having a pair of lateral ends and a wing section linked to one of the lateral ends of the center section and supporting at least one wing cutter. The center section or the wing section is raised relative to the other section from a harvesting position to a transport position, the wing section only being pivotable about a generally vertical pivot axis when the raised section is in the transport position. The wing section is then pivoted about the generally vertical pivot axis when the raised section is in the transport position.

An advantage of the agricultural harvester described herein is that the wing section(s) can pivot about the generally vertical pivot axis to reduce the width of the header for transport.

Another advantage of the agricultural harvester described herein is that the wing section(s) can also be pivotable about a horizontal axis in the harvesting position.

Still another advantage of the agricultural harvester described herein is that the wing section(s) can have attached wheels that will help stabilize the wing section(s) during travel of the vehicle.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
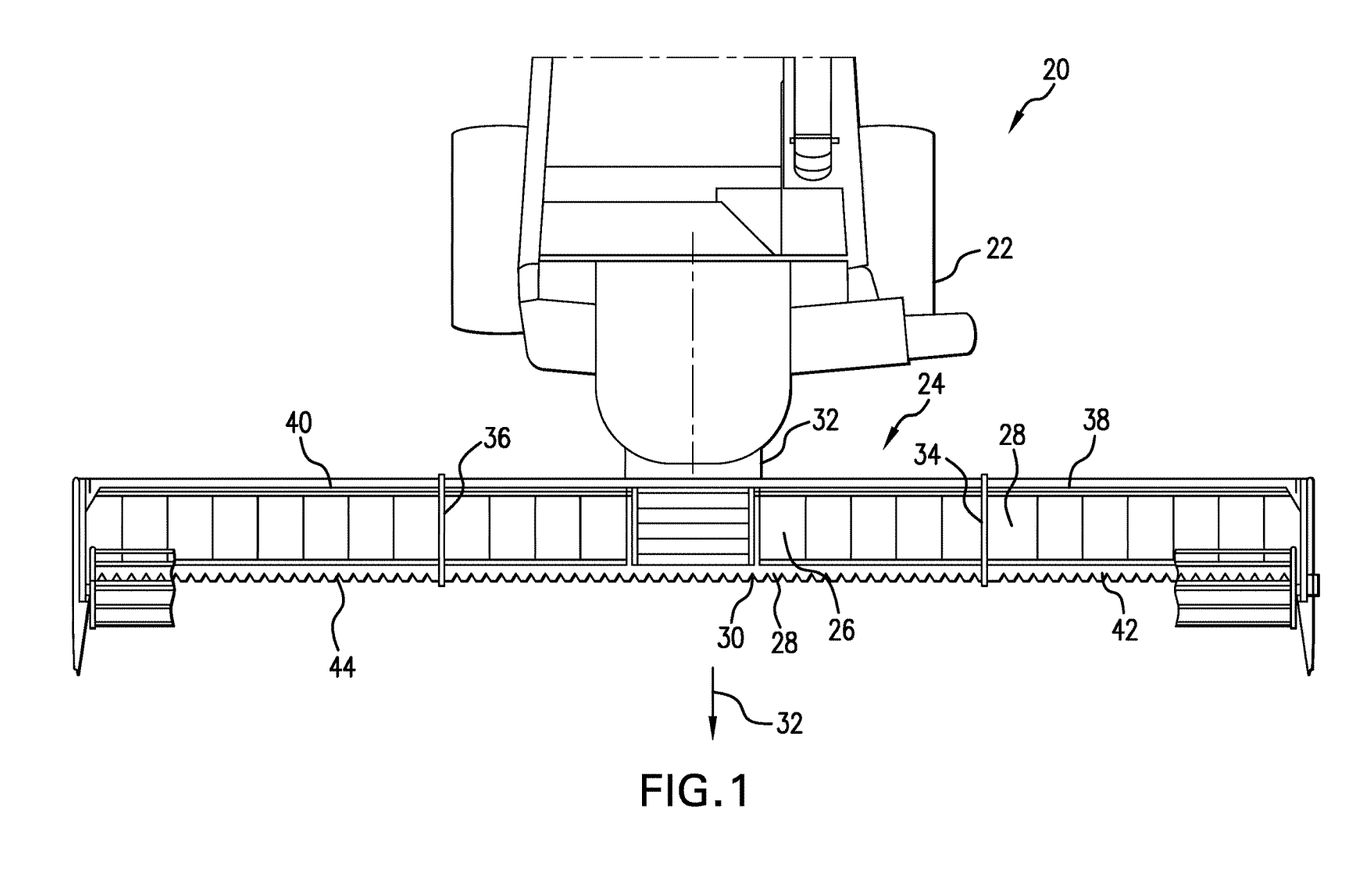
FIG. 1 is a top view of an embodiment of an agricultural harvester including a header formed in accordance with an exemplary embodiment of the present invention.

Referring now to the drawings, and more particularly to FIG. 1, there is shown an exemplary embodiment of an agricultural vehicle 20 in the form of a combine harvester which generally includes a chassis 22 and a header system 24 carried by the chassis 22, in accordance with an exemplary embodiment of the present invention. Typically, the combine harvester 20 will include additional systems for the separation and handling of collected crop material, but these additional systems are omitted from view for brevity of description. It should be appreciated that the header system 24 described and illustrated herein does not necessarily need to be included on a combine harvester, but can be incorporated in other agricultural vehicles such as mowers.

The header system 24 includes a center section 26 supporting one or more center cutters 28 with sharpened edges 30 to cut crop material as the vehicle 20 travels in a forward direction, denoted by arrow 32. As shown, the center cutter 28 is a cutter bar, but other types of cutters can also be included in place of the cutter bar 28. As shown in FIG. 1, the center section 26 is rigidly connected to the chassis 22 at a mount 32, but this is an optional configuration. The center section 26 has a pair of opposed lateral ends 34 and 36, with a wing section 38 and 40 linked to each of the lateral ends 34, 36, respectively. As used herein, "linked" signifies that each wing section 38, 40 is movably connected to its respective lateral end 34, 36, which is described further herein. The wing sections 38 and 40 each support one or more wing cutters 42, 44, which can also be cutter bars similar to the cutter bar 28 supported by the center section 26.

Figure 2:
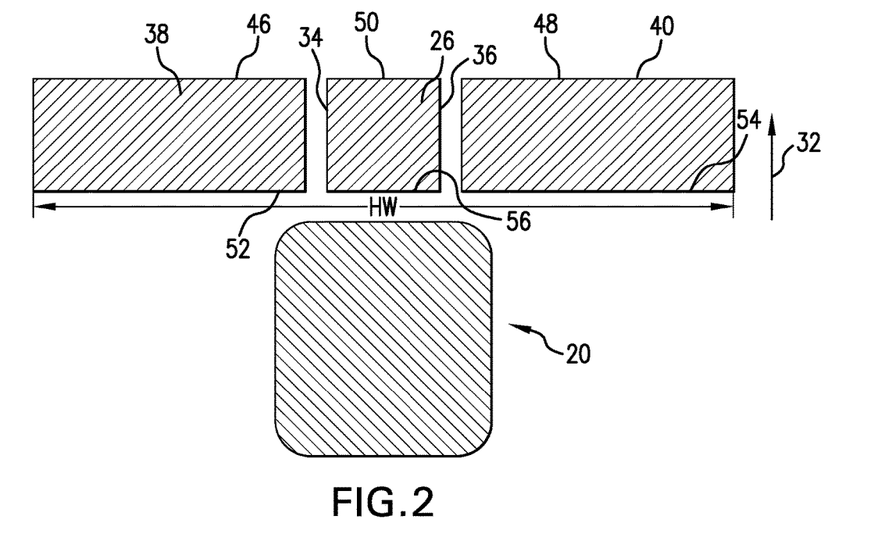
FIG. 2 is a schematic view of the harvester shown in FIG. 1 in a harvesting mode.
Figure 3:
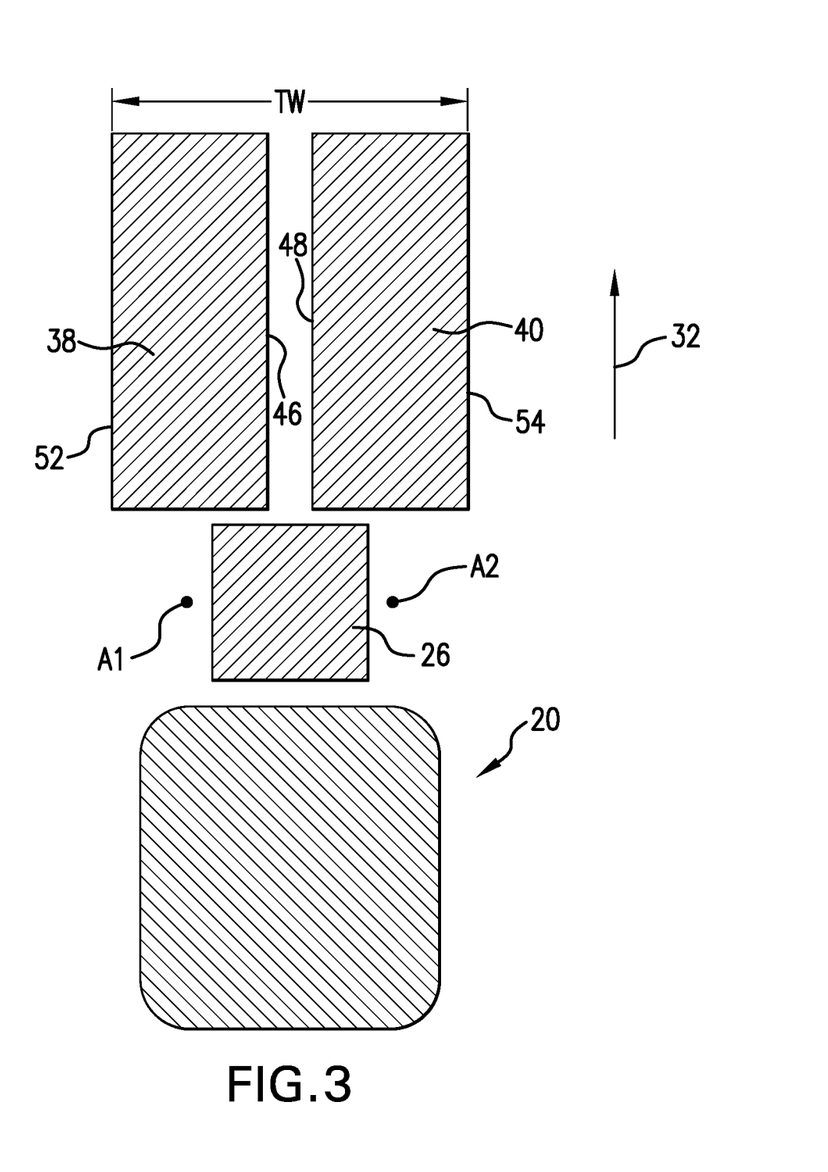
FIG. 3 is a schematic view of the harvester shown in FIGS. 1-2 in a transport mode.

Referring now to FIGS. 2 and 3, a schematic view of the combine harvester 20 is shown with the wing sections 38, 40 in a harvesting mode (FIG. 2) and a transport mode (FIG. 3), in accordance with an exemplary embodiment of the present invention. As can be seen in FIG. 2, the wing sections 38, 40 can each have a front 46, 48 which are coaxial with a front 50 of the center section 26 across a harvesting width (HW) of the header system 24 in the harvesting mode and also each have a back 52, 54 which are coaxial with a back 56 of the center section 26 across the harvesting width HW in the harvesting mode. It should be appreciated that the gaps illustrated between the wing sections 38, 40 and their respective lateral ends 34, 36 of the center section 26 are exaggerated for illustrative purposes only, and in practice the wing sections 38, 40 will generally have very small, if any, gaps formed relative to their respective lateral end 34, 36 in order to minimize the risk of crop material being lost through gaps during harvesting. In this sense, the center section 26 and wing sections 38, 40 form a continuous header system 24 across the harvesting width HW of the header 24 in the harvesting mode, allowing the cutters 28, 42, 44 to cut crop material as the combine harvester 20 advances in the forward direction 32 across a field.

Referring especially now to FIG. 3, it can be seen that the wing sections 38 and 40 have been pivoted 90 degrees, relative to the center section 26, about generally vertical axes A1 and A2 so a transport width TW of the header 24 in the transport mode is significantly less than the harvesting width HW of the header 24 in the harvesting mode. As used herein, "generally vertical" axes A1 and A2 are defined orthogonally relative to the ground plane below the wing sections 38 and 40 so pivoting of the wing sections 38 and 40 about the generally vertical axes A1 and A2 reduces the width of the header 24 relative to the forward direction 32. By pivoting the wing sections 38 and 40 relative to the center section 26 and reducing the width of the header 24 to the transport width TW, the combine harvester 20 may now meet width regulations for travel on regulated public roadways. Further, pivoting the wing sections 38 and 40 90 degrees about generally vertical pivot axes A1 and A2 such that the wing sections 38 and 40 end up in front of the center section 26 in the transport mode can increase the stability of the wing sections 38, 40 during travel, which is described further herein.

Figure 4:
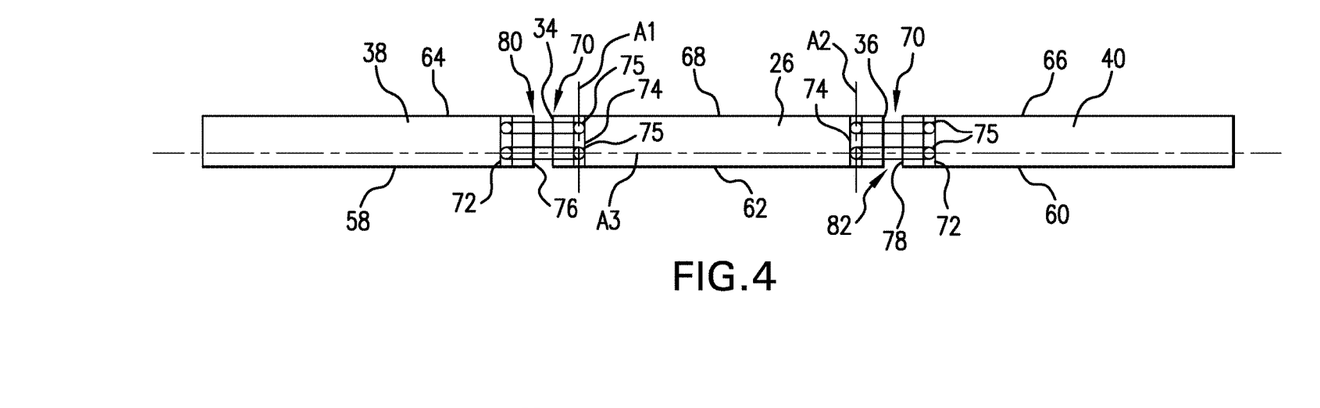
FIG. 4 is a rear view of the header shown in FIG. 1 in a harvesting position.
Figure 5:
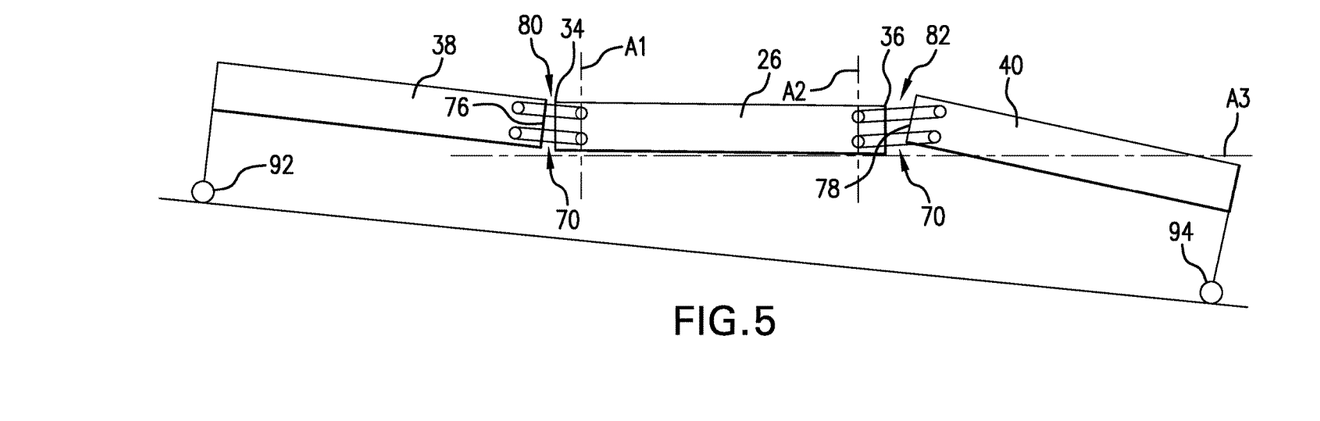
FIG. 5 is another rear view of the header shown in FIG. 4 in the harvesting position and on an inclined surface.

To illustrate how the wing sections 38, 40 pivot into the transport mode from the harvesting mode, reference is now made to FIGS. 4-7. As shown in FIG. 4, the wing sections 38, 40 are both in a harvesting position. In the shown harvesting position, the wing sections 38, 40 have bottom surfaces 58, 60 which are level with a bottom surface 62 of the center section 26 and top surfaces 64, 66 which are level with a top surface 68 of the center section 26. Each wing section 38, 40 can be linked to its respective lateral end 34, 36 of the center section 26 by a respective hinge assembly 70. As shown, the hinge assemblies 70 include a respective wing hinge 72 connected to each a respective wing section 38, 40 and a respective center hinge 74 connected to the center section 26. The wing hinge 72 and center hinge 74 are connected to each other by one or more hinge bars 76 that allow the wing sections 38, 40 to pivot about a generally horizontal axis A3 defined through the center section 26. In the harvesting position, the wing sections 38, 40 are substantially prevented from pivoting about the generally vertical axes A1, A2 due to abutment of a respective wing end 76, 78 of the wing sections 38, 40 against the respective lateral ends 34, 36 of the center section 26. Due to the wing ends 76, 78 abutting against their respective lateral ends 34, 36, undesired pivoting of the wing sections 38, 40 into the transport mode is substantially prevented while the wing sections 38, 40 are in the harvesting position. As used herein, the pivoting of the wing sections 38, 40 being "substantially prevented" about the generally vertical axes A1, A2 refers to the wing sections 38, 40 being prevented from pivoting more than about 10 degrees about the vertical axes A1, A2 in the harvesting position. As can be seen in FIG. 5, the wing ends 76, 78 of the wing sections 38, 40 can have small gaps 80, 82 formed between their respective lateral ends 34, 36 to allow tilt of the wing sections 38, 40 as the combine harvester travels across a field as well as pivoting of the wing sections 38, 40 about the generally horizontal axis A3 in order to conform to an inclined surface.

Figure 6:
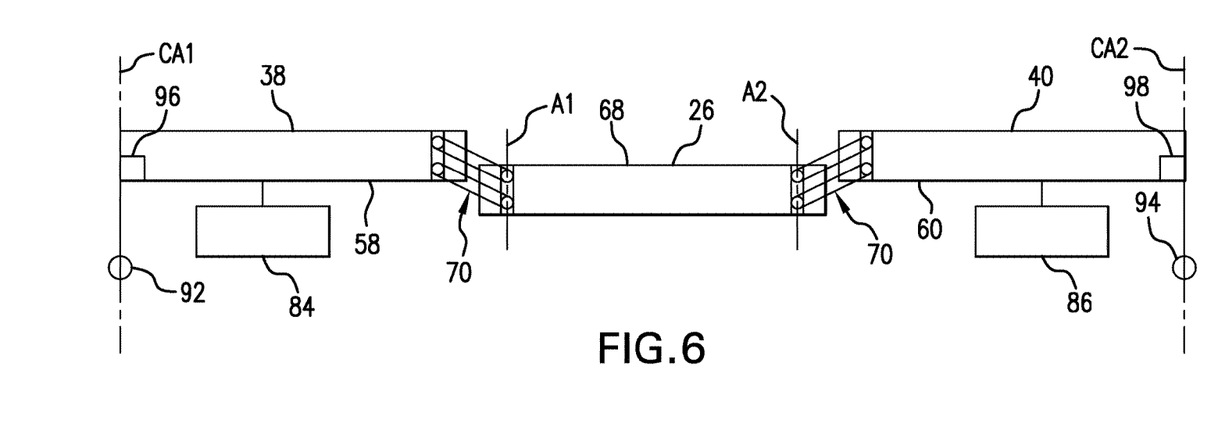
FIG. 6 is a rear view of the header shown in FIGS. 4-5 vertically moving toward a transport position.
Figure 7:
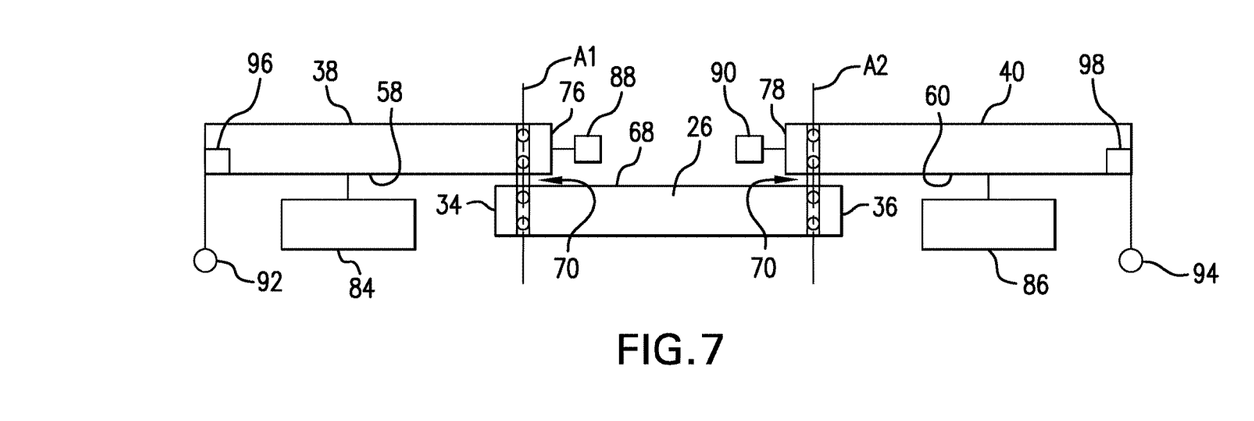
FIG. 7 is a rear view of the header shown in FIGS. 4-6 in the transport position.

Referring specifically now to FIGS. 6-7, it can be seen that the wing sections 38, 40 have been vertically moved relative to the center section 26 by actuators 84, 86 linked to each wing section 38, 40. The actuators 84, 86 can be, for example, hydraulic or pneumatic cylinders that are connected to the chassis 22 and are selectively activated by a user when it is desired to switch the header 24 between the harvest mode and transport mode. When the actuators 84, 86 are activated, each actuator 84, 86 can exert an upward vertical force on its respectively connected wing section 38, 40 to raise the wing sections 38, 40 above the top surface 68 of the center section 26, as shown in FIG. 7, which can define the transport position of the wing sections 38 and 40. Once the wing sections 38 and 40 are raised above the top surface 68 of the center section 26, the lateral ends 34, 36 of the center section 26 no longer prevent pivoting of the wing sections 38 and 40 about the generally vertical pivot axes A1 and A2, allowing the wing sections 38 and 40 to pivot about the generally vertical pivot axes A1 and A2 so the header 24 assumes the transport mode. The wing sections 38 and 40 can be pivoted about the generally vertical axes A1 and A2, for example, by a separate set of pivoting actuators 88, 90 carried by the chassis 22.

To help support the weight of the wing sections 38 and 40 during harvesting and transport, each wing section 38, 40 can have a wheel 92, 94 connected thereto that will contact the ground as the combine harvester 20 travels across a surface. The wheels 92, 94 can be, for example, caster wheels 92, 94 that will swivel about caster axes CA1, CA2 as the wing sections 38, 40 pivot about the generally vertical axes A1 and A2. As the wing sections 38 and 40 may move vertically to assume the transport position, as shown in FIGS. 6-7, it is useful if the caster wheels 92 and 94 are vertically moveable as well so the caster wheels 92 and 94 are always in contact with the ground regardless of the relative vertical positioning of the wing sections 38 and 40. To vertically move the caster wheels 92 and 94, each caster wheel 92, 94 can be linked to an associated wheel actuator 96, 98 carried by the wing sections 38, 40 that can be selectively activated to raise and lower the caster wheels 92, 94 as the relative vertical positions of the wing sections 38, 40 change. It should be appreciated that the wheel actuators 96 and 98 can be selectively activated actuators, such as cylinders, or passive actuators that will always exert an actuation force on the wheels 92, 94, such as springs. In the case of selectively actuated wheel actuators 96 and 98, the wheel actuators 96 and 98 can be electronically coupled to and controlled by a controller (not shown) that also controls the actuators 84 and 86 so activation of the wheel actuators 96 and 98 is linked to activation of the actuators 84 and 86 moving the wing sections 38, 40. Alternatively, the wheel actuators 96 and 98 vertically moving the wheels 92 and 94 can vertically move the wing sections 38 and 40 relative to the center section 26 as well, removing the need for the separate actuators 84 and 86. When the header 24 is placed in the transport mode, as shown in FIG. 3, the wheels 92, 94 also help stabilize the vehicle 20 as the vehicle 20 travels in the forward direction 32.

Figure 8:
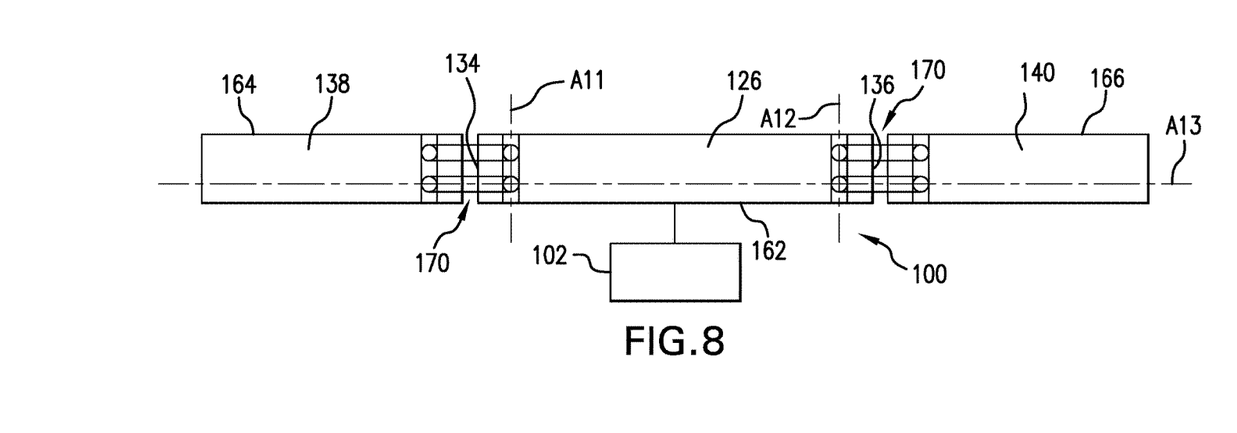
FIG. 8 is a rear view of another embodiment of a header with a center section in a harvesting position, in accordance with an exemplary embodiment of the present invention.
Figure 9:
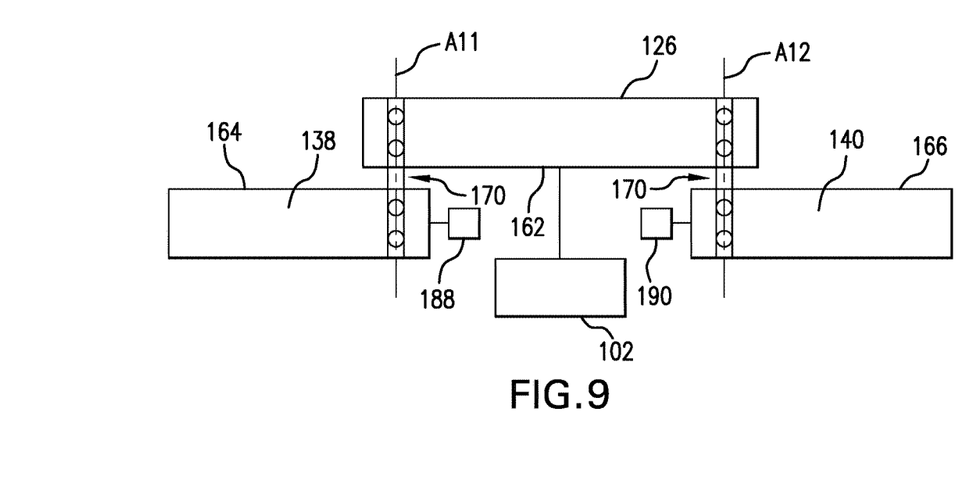
FIG. 9 is a rear view of the header shown in FIG. 8 with the center section vertically moved to a transport position.

Referring now to FIGS. 8-9, another embodiment of a header system 100 formed according to the present invention is shown. The header system 100 is similar to the header system 24 shown in FIGS. 1-7, with similar components being designated by the same reference numerals raised by 100. As can be seen, the header system 100 has a center section 126 with a wing section 138, 140 linked at each lateral end 134, 136 of the center section 126. Unlike the header system 24, however, the center section 126 of the header system 100 is vertically moveable relative to the wing sections 138 and 140 by a center actuator 102 linked to the center section 126 and the chassis 122. The center section 126, therefore, is vertically moveable relative to the chassis 122. In the harvesting position, the lateral ends 134, 136 of the center section 126 still prevent substantial pivoting of the wing sections 138, 140 about generally vertical axes A11, A12 by abutment. As the center section 126 vertically moves to a transport position by the center actuator 102, shown in FIG. 9, such that, for example, a bottom surface 162 of the center section 126 is raised above top surfaces 164, 166 of the wing sections 138, 140, the wing sections 138 and 140 might also be slightly raised before pivoting about the generally horizontal axis A13 due to the weight of the wing sections 138, 140. Once the center section 126 is fully moved to the transport position and the bottom surface 162 clears the top surfaces 164, 166 of the wing sections 138 and 140, the wing sections 138 and 140 can then be pivoted about the generally vertical axes A11, A12 by pivot actuators 188, 190 to place the header 100 in the transport mode. Other than the center section 126 being vertically moveable relative to the chassis 122 and wing sections 138, 140, the header system 100 can be similar to the header system 24.

Figure 10:
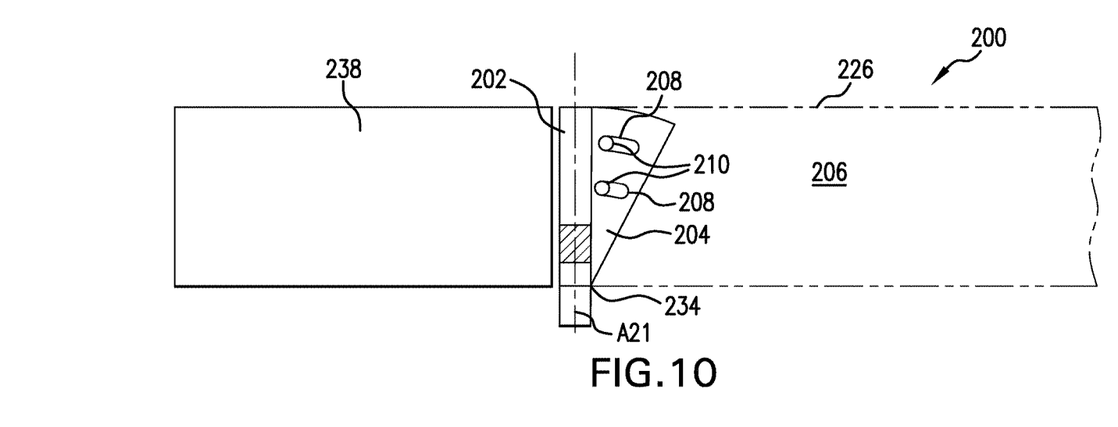
FIG. 10 is a rear view of yet another embodiment of a header, in accordance with an exemplary embodiment of the present invention.
Figure 11:
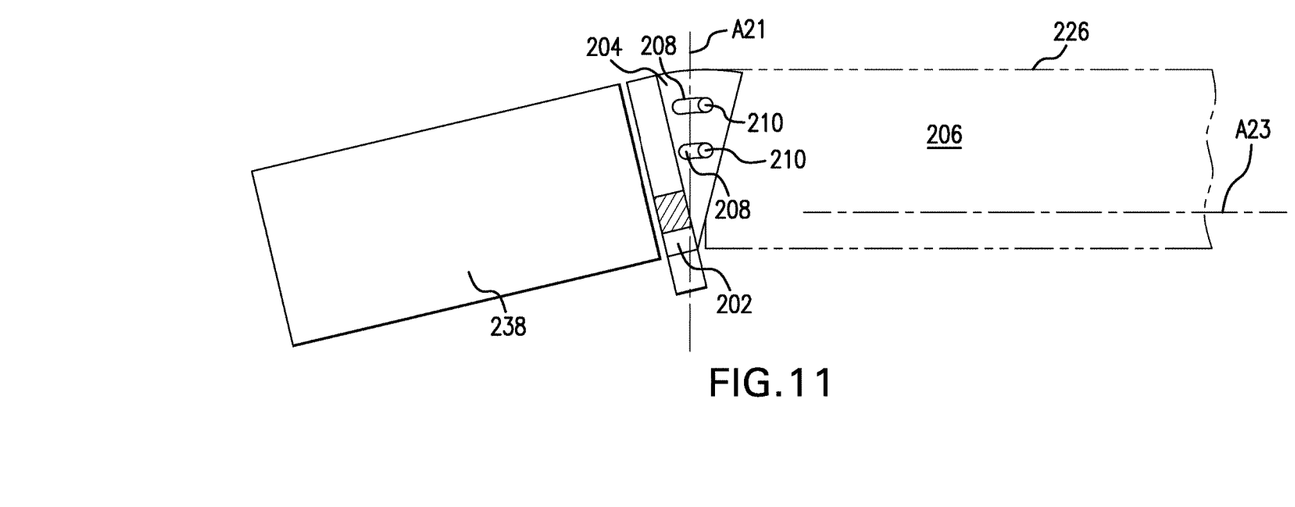
FIG. 11 is a rear view of the header shown in FIG. 10 with a wing section pivoted relative to a linked center section in a harvesting position.

Referring now to FIGS. 10-13, yet another embodiment of a header system 200 formed according to the present invention is shown. The header system 200 is similar to the header systems 24 and 100, with similar components being designated by the same reference numerals raised by 200. As can be seen, the header system 200 includes a center section 226 with a lateral end 234 and a wing section 238 linked to the lateral end 234 by a pivot tube 202. The pivot tube 202 can have, as shown, a cylindrical shape and a laterally extending stop 204 which prevents the wing section 238 from pivoting about a generally vertical pivot axis A21 by abutting against a rear surface 206 of the center section 226 in a harvesting position, as shown in FIG. 10. Thus, when forces acting on the wing section 238 cause the wing section 238 to attempt to pivot about the pivot axis A21, the abutment of the laterally extending stop 204 against the rear surface 206 prevents substantial pivoting of the wing section 238 about the pivot axis A21. To allow the wing section 238 to conform to uneven terrain, such as the terrain shown in FIG. 5, the stop 204 can include one or more arc shaped slots 208, which can also be referred to as arced slots, which accommodate pins 210 of the center section 226 to allow pivoting of the wing section 238 about a generally horizontal axis A23, as shown in FIG. 11. The pins 210 of the center section 226 can also prevent the pivot tube 202 from vertically moving along the pivot axis A21, which is described in further detail herein. The header system 200 can otherwise be similar to previously described header systems 24 and 100.

Figure 12:
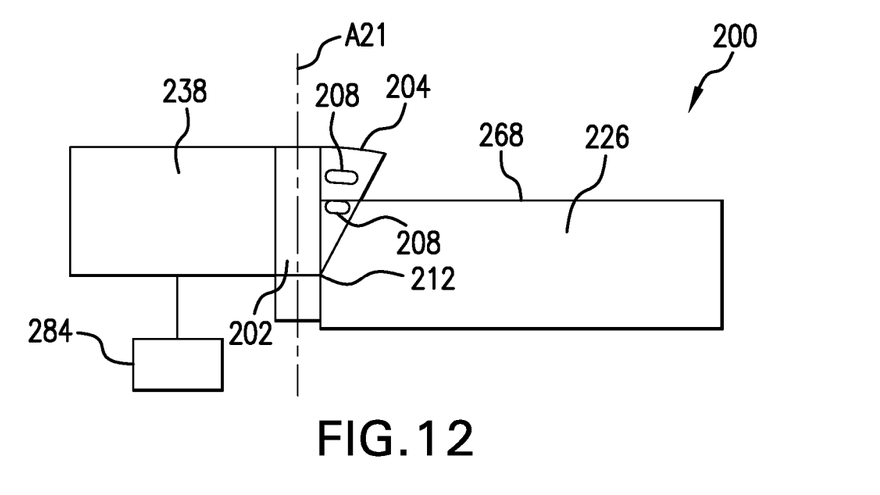
FIG. 12 is a rear view of the header shown in FIGS. 10-11 with the wing section vertically moving toward a transport position.
Figure 13:
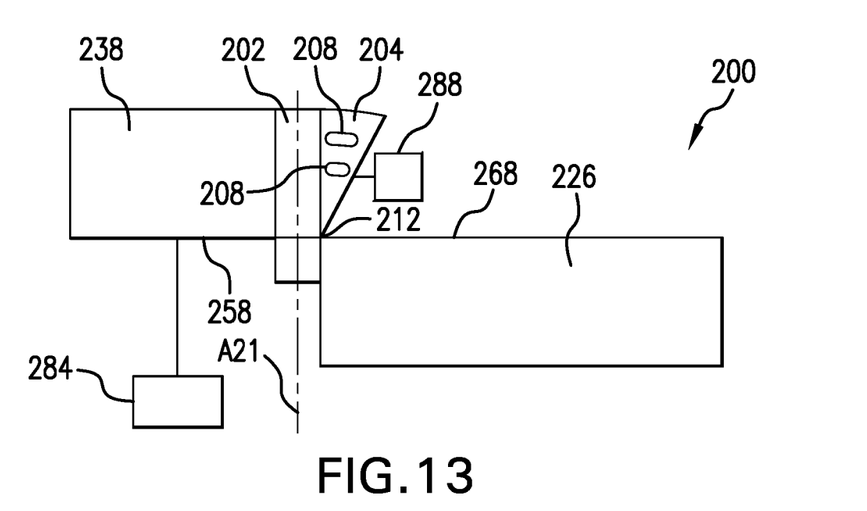
FIG. 13 is a rear view of the header shown in FIGS. 10-12 with the wing section in the transport position.

Referring specifically now to FIGS. 12-13, the wing section 238 is shown being vertically moved to a transport position by an actuator 284 linked to the wing section 238. As the pins 210 of the center section 226 prevent the pivot tube 202 from vertically moving along the generally vertical pivot axis A21, the pins 210 are first removed from the arced slots 208 of the stop 204. Once the pins 210 are removed from the arced slots 208, the actuator 284 can vertically move the wing section 238 along the generally vertical pivot axis A21 to the transport position where a bottom 258 of the wing section 238 and a bottom 214 of the stop 204 clear a top surface 268 of the center section 226. Once the bottoms 258 and 214 of the wing section 238 and stop 204, respectively, clear the top surface 268 of the center section 226, the wing section 238 can be pivoted about the pivot axis A21 without interference from abutment against the center section 226. The wing section 238 can be pivoted about the pivot axis A21 so the header 200 assumes the transport mode by, for example, a pivot actuator 288 as previously described. Once the user wishes for the header 200 to be returned to the harvesting mode from the transport mode, the pivot actuator 288 can then pivot the wing section 238 back inward about the pivot axis A21 and the actuator 284 can vertically move the wing section 238 along the pivot axis A21 back to the harvesting position. The pins 210 of the center section 226 can then be placed back into the arced slots 208 of the stop 204 to lock the wing section 238 in the harvesting position.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
   a chassis; and
   a header carried by said chassis, said header including:
      a center section supporting a center cutter and having a pair of lateral ends;
      a wing section linked to one of said lateral ends of said center section and supporting at least one wing cutter, said wing section being vertically moveable relative to said center section between a harvesting position and a transport position, said wing section being pivotally coupled to said center section about a generally vertical pivot axis in said transport position and substantially prevented from pivoting about said pivot axis in said harvesting position by way of one of an abutment of a lateral end of said center section with a lateral end of said wing section and a pivot tube having a laterally extending stop; and
      a pivoting actuator linked to said wing section and to said center section, the pivoting actuator moves said wing section along said generally vertical pivot axis from said harvesting position to said transport position.

2. The agricultural harvester according to claim 1, further comprising:
   a second wing section linked to the other of said pair of lateral ends of said center section and supporting at least one second wing cutter, said second wing section being vertically moveable relative to said center section between a second wing harvesting position and a second wing transport position, said second wing section being pivotally coupled to the center section about a generally vertical second pivot axis in said second wing transport position and substantially prevented from pivoting about said second pivot axis in said second wing harvesting position by way of an abutment of an other lateral end of said center section with a lateral end of said second wing section; and
   a second pivoting actuator linked to said second wing section and said center section, the pivoting actuator moves said second wing section along said second vertical pivot axis from said second wing harvesting position to said second wing transport position.

3. The agricultural harvester according to claim 2, wherein said transport position and said second wing transport position are both above a top surface of said center section.

4. The agricultural harvester according to claim 2, wherein said wing section has a first vertically moveable wheel attached thereto and said second wing section has a second vertically moveable wheel attached thereto.

5. The agricultural harvester according to claim 4, wherein said first vertically moveable wheel contacts the ground when said wing section is in said transport position and said second vertically moveable wheel contacts the ground when said second wing section is in said second wing transport position.

6. The agricultural harvester according to claim 1, wherein said wing section is prevented from pivoting about said pivot axis in said harvesting position by said abutment against said linked lateral end of said center section.

7. The agricultural harvester according to claim 1, wherein said wing section is vertically moveable along said pivot axis.

8. The agricultural harvester according to claim 7, wherein said wing section includes said pivot tube linked to said center section, said pivot tube including said laterally extending stop which prevents pivoting of said wing section in said harvesting position.

9. The agricultural harvester according to claim 8, wherein said laterally extending stop includes at least one arc shaped slot and said center section includes at least one pin placed in said at least one arc shaped slot.

10. An agricultural harvester, comprising:
    a chassis; and
    a header carried by said chassis, said header including:
       a center section supporting a center cutter and having a pair of lateral ends, said center section being vertically moveable relative to said chassis between a harvesting position and a transport position;
       a wing section linked to one of said lateral ends of said center section and supporting at least one wing cutter, said wing section being pivotally coupled about a generally vertical pivot axis to said center section, said wing section includes a laterally extending stop which prevents pivoting of said wing section when said center section is in said harvesting position, said laterally extending stop includes at least one arc shaped slot and said center section includes at least one pin placed in said at least one arc shaped slot; and an actuator linked to said center section to vertically move said center section from said harvesting position to said transport position.

11. The agricultural harvester according to claim 10, further comprising:
a second wing section linked to the other of said pair of lateral ends of said center section and supporting at least one second wing cutter, said second wing section being pivotally coupled about a generally vertical second pivot axis to the center section when said center section is in said transport position.

12. The agricultural harvester according to claim 11, wherein said transport position of said center section is above a top surface of both said wing section and said second wing section.

13. The agricultural harvester according to claim 10, wherein said wing section is prevented from pivoting about said pivot axis in said harvesting position by abutment against said linked lateral end of said center section.

14. A method of preparing an agricultural vehicle for transport, said agricultural vehicle including a chassis and a header linked to said chassis which includes a center section supporting a center cutter and having a pair of lateral ends and a wing section linked to one of said lateral ends of said center section and supporting at least one wing cutter, said method comprising the steps of:
raising one of said center section and said wing section relative to the other section from a harvesting position to a transport position, the section being raised being referred to as a raised section when raised, said raising step including vertically raising one of said center section and said wing section along a generally vertical axis; and
pivoting said wing section about said generally vertical axis to said transport position when said raised section has been raised, said generally vertical axis being a generally vertical pivot axis, said wing section only being pivoted about said generally vertical pivot axis when said raised section has been raised.

15. The method according to claim 14, wherein said wing section is said raised section.

16. The method according to claim 15, wherein said wing section is vertically raised along said generally vertical pivot axis from said harvesting position to said transport position.

17. The method according to claim 15, further comprising the step of vertically extending wheels from an end of said wing section opposite the generally vertical pivot axis as said wing section is raised.

* * * * *